Figure 1:
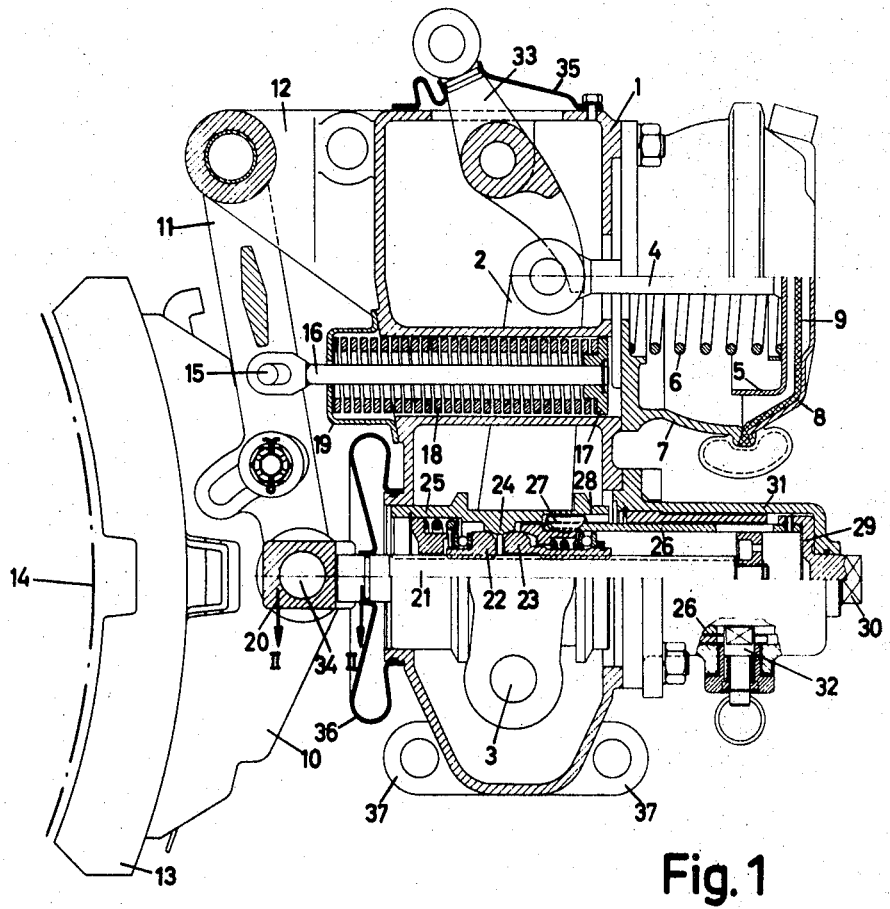

United States Patent

[11] 3,572,475

[72] Inventor Gert Artur Persson
  Oxie, Sweden
  Nils Borge Lennart Sander
  Malmo, Sweden
[21] Appl. No. 778,394
[22] Filed Nov. 25, 1968
[45] Patented Mar. 30, 1971
[73] Assignee Svenska Aktiebolaget Bromsregulator
  Malmo, Sweden

[54] RAILWAY VEHICLE WHEEL BRAKE UNIT
  2 Claims, 2 Drawing Figs.
[52] U.S. Cl. .................................................. 188/202,
  188/217
[51] Int. Cl. .................................................. F16d 65/56
[50] Field of Search .......................................... 188/52,
  153, 196 (PRR), 198—203 (S), 217

[56] References Cited
UNITED STATES PATENTS
3,430,740  3/1969  Larsson et al. .............. 188/202(S)
FOREIGN PATENTS
450,481  4/1968  Switzerland ................. 188/203(S)

*Primary Examiner*—Duane A. Reger
*Attorney*—Laurence R. Brown

ABSTRACT: A railway wheel brake unit, having a pivoted brake shoe lever moved by a piston into braking braking position by means of the engagement with a slack-adjusting mechanism and forced by a spring away from braking position, includes a pivoted coupling member on the brake shoe lever with a V-shaped groove registering a V-shaped end pushing member on the slack adjusting mechanism to thereby permit sliding engagement in the plane of movement of the brake shoe lever without rotation.

Patented March 30, 1971

3,572,475

INVENTORS
Gert Artur Persson
Nils Borje Lennart Sander
BY Laurence R. Brown
ATTORNEY

RAILWAY VEHICLE WHEEL BRAKE UNIT

This invention relates to a railway vehicle wheel brake unit of the kind comprising a housing, a brake lever pivotally mounted in the housing, a brake shoe movably supported outside the housing, a piston for moving the brake lever and transmission means for transmitting brake-applying force from the brake lever to the brake shoe for applying the brake to an adjacent vehicle wheel, and a piston return spring to move the piston and brake lever for releasing the brake from the vehicle wheel.

Brake units of the kind referred to are employed, for example, on vehicles such as locomotives and powered rail cars where the space required by conventional brake riggings is not available, and one brake unit being of suitably small outer dimensions can readily be mounted adjacent to each wheel of a vehicle.

In known brake units of the kind referred to the said transmission means for transmitting braking force from the brake lever to the brake shoe for applying the brake usually include one or more pivotal connections, and may include parts of an automatic slack-adjusting device. This said pivotal connection or connections must allow the brake shoe to move in a circular path when the brake shoe is supported by a suspension arm, and the pivotal motions of the brake lever must also be accommodated. The brake block is subject to vibrations during normal running of the vehicle as well as during braking, and it is a disadvantage that such vibrations may cause unintended relative movements of the automatic slack-adjusting device.

The present invention is therefore intended to provide an improved brake unit of the kind referred to and such that the said disadvantage is reduced or obviated.

According to the present invention a brake unit of the kind referred to is characterized in that the said transmission means includes a push member constituted by a threaded spindle of an automatic slack adjuster, the other end of said spindle engaging a counterthrust member constituted by a pivotally mounted block through contact surfaces having V-shape in horizontal section so as to allow relative movements in vertical direction, but preventing relative rotational movements. Further and optional features of the invention appear from the following description and are set forth in the appended claims.

In the accompanying drawing a brake unit in accordance with the invention is illustrated partly diagrammatically and by way of example.

FIG. 1 being a view of the brake unit partially in vertical section; and

Figure 2:
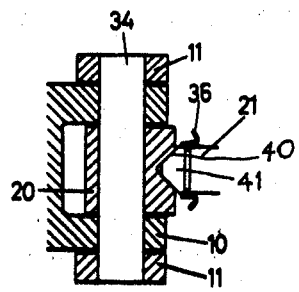

FIG. 2 being a detail view in section on the line 11-11 in FIG. 1.

The illustrated brake unit is shown in the brake-released condition and comprises a housing 1, a brake lever 2 pivotally mounted on a pivot pin 3 in the housing 1, a piston rod 4 pivotally connected to the brake lever 2, and a piston 5 rigidly connected to the piston rod 4 and acted upon by a piston return compression spring 6. The piston 5 is movable in cylinder 7 rigidly connected to the housing 1 and having a top cover portion 8 clamped thereon. Between said cylinder 7 and said top cover portion 8 is clamped a flexible diaphragm 9. The piston 5 is moved towards the brake-applying position by the flexible diaphragm 9 when compressed air is fed to the space between the diaphragm 9 and the top cover portion 8.

A brake shoe 10 is pivotally connected to a suspension arm 11 which in turn is pivotally connected to a bracket 12 integral with the housing 1 to move in a pivot plane parallel to the view of FIG. 1. The brake shoe 10 carries a brake block 13 adapted to engage a vehicle wheel 14 indicated by a dash-dotted line. The suspension arm 11 is provided with a pin 15 which extends through an elongated eye at the outer end of an axially movable rod 16 extending into the housing 1. The rod 16 thus has a lost motion connection with the suspension arm 11, and the inner end of said rod 16 is provided with a spring abutment 17 against which a compression spring 18 presses. The said spring 18 also bears against a cover 19 rigidly connected to the housing 1. The suspension arm 11 carries a coupling member block 20 having a vertical groove 40 of V-shape taken in horizontal section extending into the sheet as shown in FIG. 2. The spring 18 acts as a return spring, urging the arm 11 and brake shoe 10 away from the wheel 14 and towards the released brake position and urging the block 20 towards a screw-threaded axially movable spindle 21 the outer end of which has a complementary V-shaped end pusher portion 41 to engage in the groove of the block 20. The V-shaped groove 40 and the V-shaped end portion have apices lying in or parallel to the plane of movement of the pivoting lever 11 to produce free vertical sliding movement as referenced to the drawing sheet.

The spindle 21 constitutes a push member, and the block 20 constitutes a counterthrust member, these two members 21 and 20 being thus arranged to press against one another for transmitting the brake-applying force, but these two members 20 and 21 are disposed so that tension forces or forces in vertical directions cannot be transmitted from one to the other of these two members. The block 20 is pivotally mounted on a pivot pin 34 by which the brake shoe 10 is pivotally connected to the suspension arm 11 which supports the brake shoe 10.

The brake unit incorporates an automatic slack-adjusting device which includes the screw-threaded spindle 21. The spindle 21 does not rotate because of the engagement of its V-shaped end portion in the groove of the block 20. When the brake is released the axial position of the spindle 21 is determined by two nuts 22 and 23 engaging an inwardly extending flange 24 on a sleeve 25 guided radially in the housing 1 and guided and moved axially by the brake lever 2. The sleeve 25 and thus the two nuts 22 and 23 may be manually rotated by rotation of a sleeve 26 having an outwardly extending ridge 27 engaging a correspondingly shaped axially extending groove 28 in the sleeve 25. The sleeve 26 is provided with a cover 29 having a square head 30 protruding from a cover 31 rigidly secured to the housing 1 for effecting manual rotation. Before such manual rotation can be carried out a locking pin 32 extending through the cover 31 into a slot in the sleeve 26 must be withdrawn from said slot in the sleeve 26 by pulling on a handle ring against the action of a compression return spring. The sleeve 26 is provided with several slots disposed over its circumference and adapted to be engaged by the locking pin 32. Thus it will be easy to obtain a suitable locking position, and after manual rotation the engagement between the lever 2 and the sleeve 25 will probably be at a different part of the circumference of the sleeve 25.

A two-armed lever 33 is pivotally mounted in the housing 1, the lower end of said lever 33 being adapted to engage the brake lever 2 and the upper end of the lever 33 protruding from the housing 1 being adapted to be engaged by a hand brake linkage.

Flexible dirt-excluding covers 35 and 36 are provided in known manner, and the housing 1 has conventional apertured lugs 37 for bolting to suitable parts of the vehicle chassis.

The brake unit as shown and described will function as follows:

When compressed air is supplied to the space between the top cover portion 8 and the flexible diaphragm 9, the said diaphragm 9 will engage the piston 5 and move said piston 5 and the piston rod 4 towards the left as viewed in FIG. 1. The brake lever 2 will be turned counterclockwise around the pivot 3 and move the sleeve 25 axially towards the left. The two nuts 22 and 23 and the spindle 21 will participate in the axial movement of the sleeve 25 and cause the block 20, the brake shoe 10 and the brake block 13 to perform a movement towards the left, following a path defined by the suspension arm 11. This movement is stopped by the contact between the brake block 13 and the adjacent wheel 14. The movements of the above-mentioned elements from their released brake positions to their applied brake positions are opposed by the spring 18 urging the rod 16 and thus the pin 15 towards the right as viewed in FIG. 1. Owing to the fact that the engagement by pressure between the block 20 and the spindle 21 is not able to transmit tension forces the piston return spring 6 is not able to retract the brake shoe 10 from its applied brake position but the shoe 10 is retracted away from the wheel 14 by the separate spring 18 when the compressed air is exhausted and the piston 5 moves towards the right.

It will be understood that in the illustrated brake unit according to the invention the spindle 21 will be prevented from unintended rotations and will be substantially isolated from vertical vibrations and shocks from the brake block 13 and the brake shoe 10. Furthermore, the guiding of the sleeve 25 in its radial direction can be effected without regard to the circular path of the brake shoe 10 defined by the suspension arm 11.

The invention is not limited to the use of a slack-adjuster or of any special type of slack-adjuster in the brake unit. The illustrated brake unit comprises an automatic slack-adjuster similar in many respects to the type described in the U.S. Pat. application Ser. No. 662,446 (Patent No. 3,430,740) but this is not a necessary limitation of the use of the invention.

We claim:

1. An improvement in a railway vehicle brake unit of the kind having a pivotally mounted brake lever moving in a pivot plane and having a brake shoe coupled thereto, a linkage moving the brake lever to contact the brake shoe with a wheel on said vehicle, and spring means to move the linkage and brake shoe away from the wheel, comprising in combination, transmission means in said linkage including a push member constituting the end of a threaded spindle of an automatic slack adjuster, and a coupling member between said brake lever and said push member permitting said lever and said push member to move relatively with respect to said pivot plane but preventing rotary movement of said push member wherein the coupling member includes a block pivotally mounted on the brake lever with a groove therein lying in or parallel with said pivot plane, and projection means on the end of said push member registering in said groove.

2. The improvement defined in claim 1 wherein said groove is V-shaped and the corresponding projection means registering therein is V-shaped.